United States Patent [19]

Watanabe et al.

[11] Patent Number: 5,084,767
[45] Date of Patent: Jan. 28, 1992

[54] TELEVISION SIGNAL RECORDING AND REPRODUCING SYSTEM USING OPTICAL RECORDING MEDIUM

[75] Inventors: Tatsuo Watanabe, Mitaka; Fujio Tanaka; Koji Ono, both of Tokyo; Shizuo Suzuki, Tama, all of Japan

[73] Assignee: Kokusai Denshin Denwa Kabushiki Kaisha, Tokyo, Japan

[21] Appl. No.: 400,526

[22] Filed: Aug. 30, 1989

[30] Foreign Application Priority Data

Sep. 14, 1988 [JP] Japan .................. 63-231127

[51] Int. Cl.5 .......................................... H40N 5/92
[52] U.S. Cl. ............................... 358/340; 358/330
[58] Field of Search ............... 358/327, 336, 340, 330, 358/335, 324; 369/107

[56] References Cited

U.S. PATENT DOCUMENTS 4,481,547 11/1984 Sato ....................... 358/330
4,654,726 3/1987 Kluth ...................... 358/335

Primary Examiner—Donald McElheny, Jr.
Assistant Examiner—Khoi Truong
Attorney, Agent, or Firm—Emmanuel J. Lobato; Robert E. Burns

[57] ABSTRACT

A television signal recording and reproducing system is disclosed in which the polarity of a television signal is inverted in polarity prior to its recording on an optical recording medium and is again inverted when it is reproduced to avoid any serious degradation of picture quality.

5 Claims, 5 Drawing Sheets

PRIOR ART
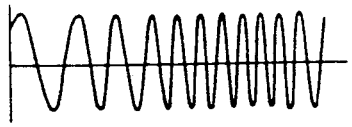
Fig.1A
Fig.1B
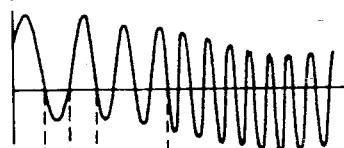
Fig.1C
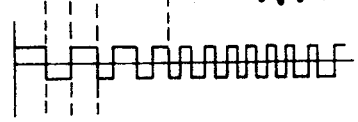
Fig.1D
Fig.1E
Fig.2 PRIOR ART
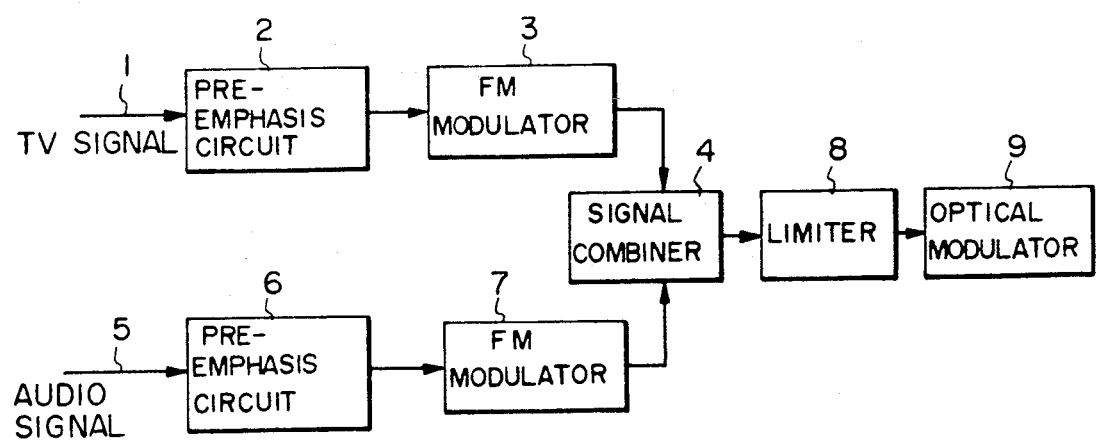

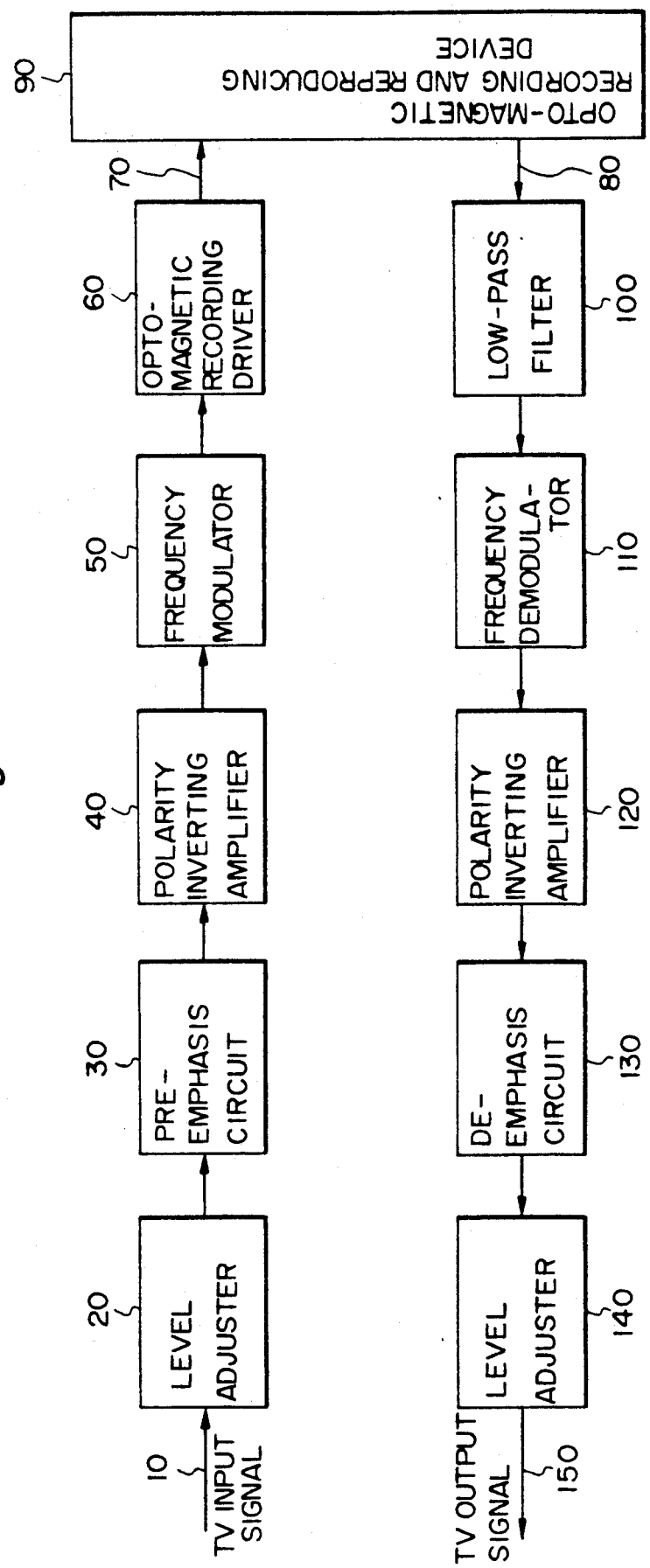

TELEVISION SIGNAL RECORDING AND REPRODUCING SYSTEM USING OPTICAL RECORDING MEDIUM

BACKGROUND OF THE INVENTION invention relates to a television signal recording and reproducing system employing an optical recording medium for recording thereon and reproducing therefrom a television signal which is an analog image signal.

For recording and reproducing of an analog image signal which has a wide band characteristic, such as a television signal (hereinafter referred to as a TV signal), a magnetic tape is generally used as in a video tape recorder (VTR). In recent years, however, there has been developed a recording and reproducing system which utilizes an optical disc, opto-magnetic disc, or similar optical recording medium, and the system has already been put to practical use in an optical disc (a laser disc) exclusively for reproducing.

The recording of a TV signal by the use of such a frequency modulation system, which uses an FM wave frequency-modulated with the TV signal, usually calls for a frequency band twice that of the TV signal. On this account, for recording the TV signal on a supplementable or reloadable optical disc, it is necessary that the optical disc possess wide band performance which permits recording of high frequency components as well. Further, a physically high precision readout device is needed for reading out recorded pits.

In general, according to the conventional frequency modulation system (hereinafter referred to as a "positive modulation system"), as the frequency increases, the pit length to be recorded decreases and the recording energy decreases. Moreover, the accuracy of the pit length lowers in relation to the pit length and the SN ratio of the TV signal (ratio of signal to noise of TV signal before frequency modulation) drops. Besides, during reproducing of pits fluctuations of the readout output, which occur at pit ends, cause a rapid decrease in the CN ratio of the FM wave (ratio of carrier power of an FM wave frequency-modulated by a TV signal to noise power in a frequency band of the FM wave) with an increase in frequency.

On the other hand, optical recording media now available are the afore-mentioned laser disc for playback only and optical discs of supplementable or reloadable type. The laser disc is advantageous in that the SN ratio in reproducing is excellent and that the same recorded information can be produced in large quantities, since recorded information is physically written on the disc, but the laser disc is defective in that recorded information cannot be erased nor can new information be written. In contrast thereto, the optical disc permits recording and reproducing of information and enables recording of a large quantity of information but has a shortcoming that the SN ratio in reproduction is lower than that of the laser disc. "Accordingly, even if the frequency modulation system now employed in the laser disc is applied to the optical disc, it is difficult to obtain a sufficiently excellent reproduced signal." Although there has been strong demand for a recording and reproducing system which would not incur any significant degradation of the picture quality even if applied to the optical disc, such a system has not yet been proposed at all.

SUMMARY OF THE INVENTION

It is therefore an object of the present invention to provide a television signal recording and reproducing system which permits the use of an optical recording medium without causing any serious degradation of picture quality.

The present invention resides in that the polarity of a television signal is inverted in polarity prior to its recording on an optical recording medium and is again inverted when it is reproduced.

BRIEF DESCRIPTION OF THE DRAWINGS

The present invention will be described in detail below in comparison with prior art with reference to the accompanying drawings, in which:

FIGS. 1A, 1B, 1C, 1D and 1E are waveform diagrams for explaining the operation of a conventional recording system;

FIG. 2 is a block diagram showing the construction of the conventional recording system;

FIG. 5 is a block diagram illustrating an example of the constitution of the TV signal recording and reproducing system of the present invention;

DETAILED DESCRIPTION

Figure 3:
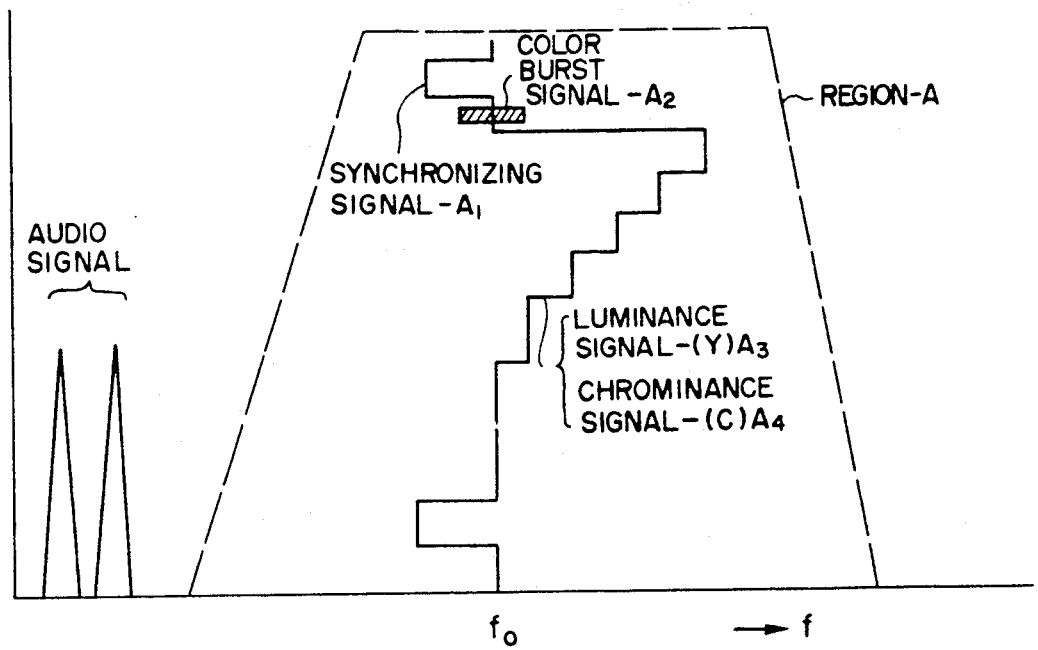
FIG. 3 is a characteristic diagram showing a relationship between the voltage of a TV signal and a frequency shift in a conventional frequency modulation system.

To make differences between prior art and the present invention clear, prior art will first be described.

FIGS. 1A through 1E are diagrams schematically showing waveforms in recording a TV signal on a laser disc according to the prior art.

FIG. 1A shows an FM wave frequency-modulated with a TV signal to be recorded. This FM wave is constant in amplitude and has all information signals converted on the frequency axis. FIG. 1B shows an audio FM signal wave, which is combined with the TV signal depicted in FIG. 1A. FIG. 1C shows a composite waveform of the video signal and the audio signal. The composite waveform is applied to a limiter, by which it is made constant in amplitude to obtain such a limited waveform as depicted in FIG. 1D. The duration of this rectangular limited wave on the plus side (i.e. the mark side) is used as a recording signal (a pit) of the optical laser disc, as illustrated in FIG. 1E. Since such pits equivalently represent the limited waveform of FIG. 1D, signals from the laser disc can be reproduced by faithfully reading out therefrom the pits.

FIG. 2 is a block diagram of a conventional TV signal recording system.

A signal 1 is a TV signal (a mixed signal containing a chrominance signal), which is provided via a pre-emphasis circuit 2 to an FM modulator 3, from which it is applied as an FM signal to a signal combiner 4.

On the other hand, an audio signal 5 is also applied via a pre-emphasis circuit 6 to an FM modulator 7, from which it is provided as an FM signal to the signal combiner 4, wherein it is combined with the frequency-modulated TV signal into a composite signal. The composite signal is converted by a limiter 8 into an equivalently pulse-width-modulated signal, which is further subjected to modulation, such as intensity or magnetic field modulation, by an optical modulator 9. The thus modulated signal is recorded on the laser disc in the form of a state "1" or "0", for example, depending on whether voltage is positive or negative.

FIG. 3 shows, on the frequency axis, the TV signal according to the conventional positive modulation system. The region A shows the range in which a spectrum (a first side band wave) after frequency modulation exists. In the region A indicated by the broken line a synchronizing signal $A_1$, a color burst signal $A_2$, a luminance signal (Y) $A_3$, and a chrominance signal (C) $A_4$ are sequentially arranged along the time axis as shown. The chrominance signal $A_4$ occurs within a frequency range of $\pm 3.58$ MHz having a center frequency-shifted in correspondence to the voltage value of the luminance signal $A_3$. Accordingly, as the luminance signal $A_3$ of the TV signal increases, the frequency rises.

Figure 4:
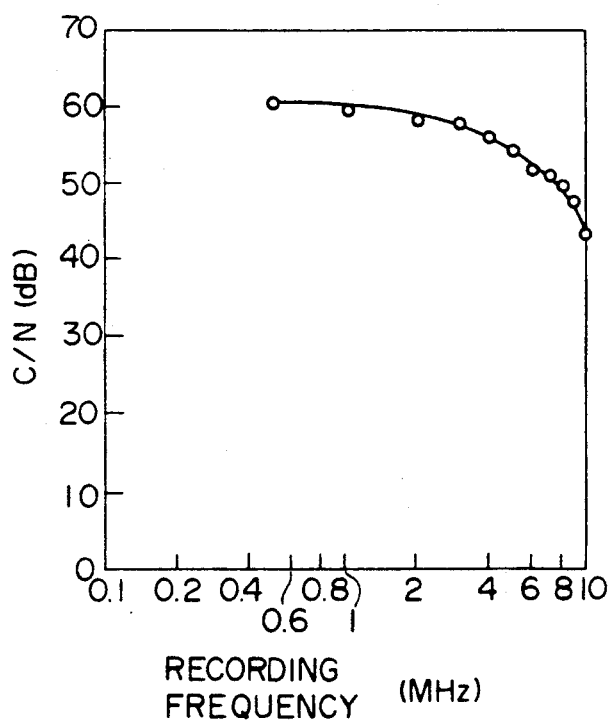
FIG. 4 is a graph showing the frequency vs. C/N characteristic of a signal recorded on an optical disc.

FIG. 4 shows the frequency characteristic of an optical recording medium such as an optical disc, which was measured when the recording power was 6 mW, the readout power 3 mW, and the number of revolutions 1800 r.p.m. As will be seen from FIG. 4, as the recording frequency rises, the CN ratio decreases, and in the vicinity of 4 MHz, the CN ratio goes down about 5 to 6 dB as compared with the CN ratio at 1 MHz.

With reference to the accompanying drawings, the present invention will hereinafter be described in detail.

(Embodiment 1)

FIG. 5 illustrates in block form the TV signal recording and reproducing system employing an optical disc in accordance with a first embodiment of the present invention.

In FIG. 5, reference numeral 10 indicates a TV signal input terminal, 20 a level adjuster for adjusting an input TV signal, 30 a pre-emphasis circuit for preventing deterioration of the SN ratio in a high frequency band, 40 a polarity inverting amplifier characteristic of the present invention for inverting the polarity of the TV signal, 50 a frequency modulator for frequency modulating the output of the polarity inverting amplifier 40, 60 an opto-magnetic recording driver which records the TV signal and, in general, provides an output at the TTL level, and 90 an optical disc recording and reproducing device which operates on the output 70 of the opto-magnetic recording driver 60. All of these elements, but especially elements 60, 70 and 90, constitute recording means. In contrast to the positive modulation in the prior art, the modulation of the TV signal in the present invention is referred to as negative modulation, because it is performed by inverting the polarity of the signal.

On the other hand, reproducing (readout) means comprises a low-pass filter 100 which cuts off high-frequency components of the output signal 80 read out of the opto-magnetic recording and reproducing device 90 to provide for an improved SN ratio, a frequency demodulator 110 for frequency-demodulating the output signal of the low-pass filter 100, a polarity inverting amplifier 120 for re-inverting the polarity of the TV signal inverted when it was recorded on the optical disc, a de-emphasis circuit 130 for restoring the original frequency-amplitude characteristic, and a level adjuster 140 for obtaining a final output TV signal.

Figure 6:
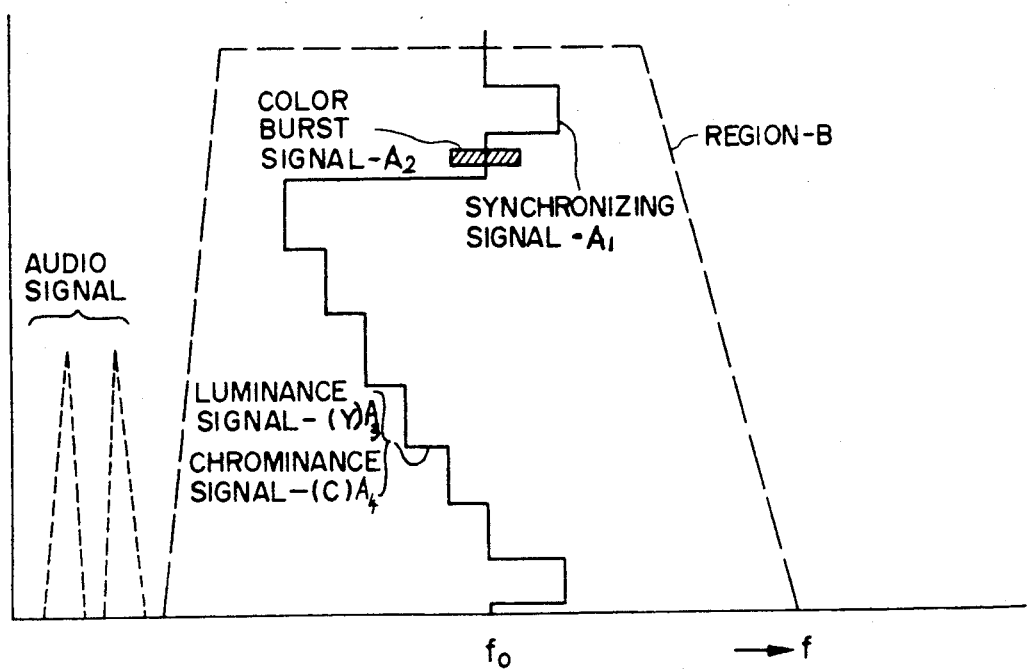
FIG. 6 is a characteristic diagram showing a relationship between the voltage of an polarity-inverted TV signal and a frequency shift according to the present invention.

FIG. 6 shows, on the frequency axis, the TV signal subjected to the negative modulation by the frequency modulator 50 via the polarity inverting amplifier 40 which is a feature of the present invention.

The region B shows, as is the case with the region A (FIG. 3), a range in which the spectrum (the first side band wave) after the frequency modulation exists. In the region B the synchronizing signal $A_1$, the color burst signal $A_2$, the luminance signal (Y) $A_3$, and the chrominance signal (C) $A_4$ are arranged in a polarity reverse from that in the region A as shown. Consequently, according to the present invention, an increase in the luminance signal $A_3$ of the TV signal causes a frequency shift to the lower side, so that the TV signal can be written on the optical disc without degrading the CN ratio.

As described above, the present invention is adapted so that the output of the pre-emphasis circuit 30 is frequency-modulated by inverting the polarity of the TV signal with the polarity inverting amplifier 40, thereby shifting the luminance components of the TV signal to lower frequencies. On the other hand, the synchronizing signal (a horizontal synchronizing signal) is shifted to the higher frequency side, but since its voltage ratio is small as compared with the luminance signal, the influence of the reduction of the CN ratio is relatively small. Moreover, according to the present invention, since the luminance signal (the Y signal) and the chrominance signal (the C signal) are frequency-modulated not individually but as a composite signal, the spectrum of the chrominance signal occurs within a frequency range of $\pm 3.58$ MHz having a center frequency-shifted in correspondence to the voltage value of the luminance signal.

Generally, in the frequency modulation of the TV signal the spectrum of the frequency component of the luminance signal becomes asymmetrical, but a sine-wave signal such as the chrominance signal has a spectrum symmetrical with respect to a center. Accordingly, in a case of such a signal, even if the components of one side band wave is cut, the original signal can be still reproduced. In the optical disc, since the recording level in the high-frequency region decreases as mentioned previously, the frequency components which are particularly high in the signal energy of the upper side band markedly decrease as compared with the frequency components of the lower side band wave. Consequently, the upper side band hardly contributes to an increase in the SN ratio, and in addition, the use of the both side band wave components causes an increase in noise power. In view of this, the present invention utilizes a vestigial side-band wave (VSB) system in which the upper side band wave having the same components as that of the lower side band wave is cut off, to decrease the energy of the upper side band wave which contributes to noise, thereby improving the SN ratio.

While in the above the negative modulation is implemented by the use of the TV signal polarity inverter, it is 1 apparent that the negative modulation can be achieved without using the above polarity inverter, if the input-output characteristic of the frequency modulator, that is, the relationship of the output frequency to an increase in the input voltage is such that the output frequency decreases with an increase in the input.

(Embodiment 2)

Figure 7:
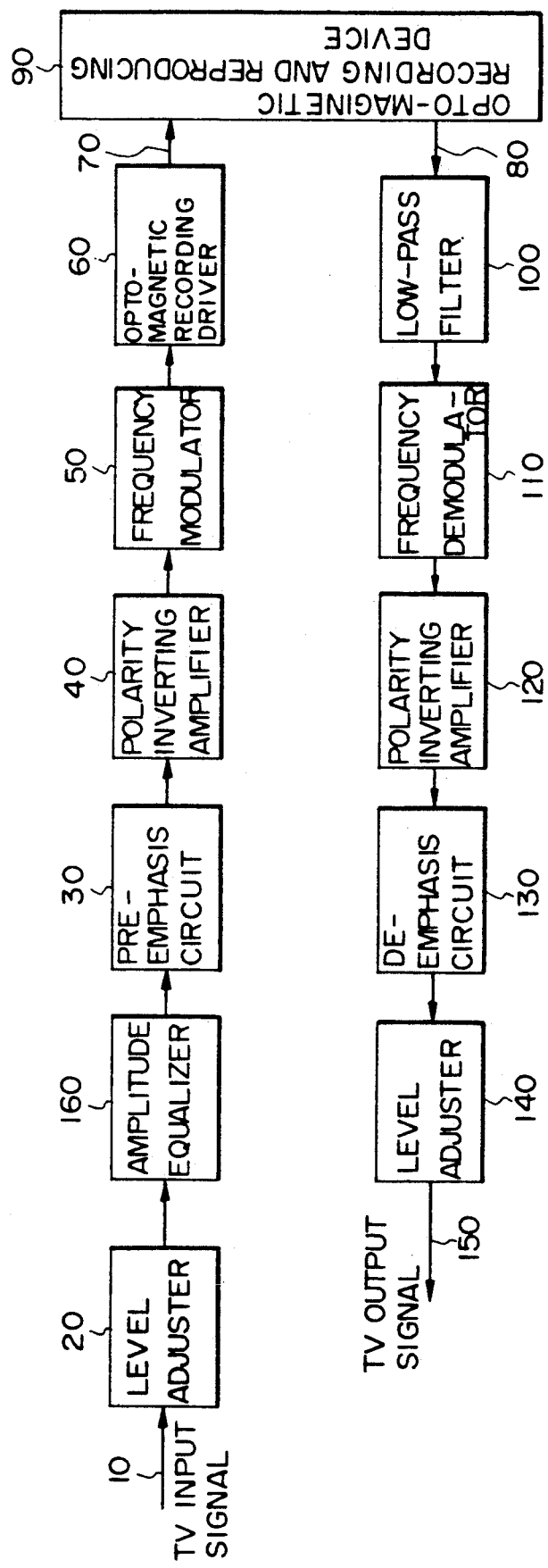
FIG. 7 is a block diagram illustrating another example of the constitution of the TV signal recording and reproducing system of the present invention.

FIG. 7 illustrates a second embodiment in which an amplitude equalizer 160 is provided in the recording means.

As referred to in the above, the CN ratio of the FM signal read out of the optical disc rapidly decreases with a decrease in the frequency as shown in FIG. 4, so that the energy of the upper side band wave which contributes to the demodulated signal decreases, and in such a region the modulation index reduces by half. In consequence, the demodulated signal is low in the amplitude of the high frequency components. This indicates that the original signal can faithfully be reproduced by providing in the reproducing means an amplitude equalizer for compensating for the high frequency components of the FM signal read out of the optical disc, or by presetting to be high the degree of modulation for the high frequency components so as to compensate for the decrease in the high frequency components during modulation in the recording means. Since the former impairs the SN ratio by a rise of the noise level, the latter is preferable. In the case of employing the low-pass filter 100 according to the present invention, the pre-emphasis characteristic on the transmitting side needs only to be changed in such a manner as to compensate for the deterioration of the frequency characteristic which is caused by the provision of the low-pass filter 100 on the demodulating side. To this end, the present invention compensates for the deterioration of the frequency characteristic by inserting the amplitude equalizer 160 in the recording means. This embodiment is identical in construction with Embodiment 1 except the above.

As described above, the present invention effectively prevents deterioration of the SN ratio through utilization of the negative modulation system for using the low frequency region in which the CN ratio is excellent which is one of the characteristics of the optical recording medium.

By using a modulator of a predetermined input-output characteristic as the inverting/modulating means, the negative modulation can be achieved by the modulator alone without using the polarity inverter.

The polarity inversion can easily be performed by using an inverting amplifier as the polarity inverting means.

Moreover, the original television signal can faithfully be reproduced by compensating for degradation of the frequency characteristic, which is caused by the filter means, by changing the frequency characteristic of the pre-emphasis means, or by increasing the amount of frequency shift with the amplitude equalizer which is provided in the stage preceeding the pre-emphasis means.

Thus, the present invention enables an analog image signal of a wide band to be record on and reproduced from an optical recording medium of a poor CN ratio. Hence the present invention is of great utility in practical use.

What we claim is:

1. A television signal recording and reproducing system in which a frequency-modulated output of a television signal is recorded on an optical recording medium and a signal read out therefrom is demodulated by a demodulator to reproduce the television signal, characterized by the provision of:
   pre-emphasis means for precompensating for a high frequency deterioration of the frequency characteristic of the television signal;
   inverting/modulating means for frequency modulating the precompensated television signal by inverting its polarity;
   recording means for recording the modulated signal on the optical recording medium;
   filter means for cutting off a portion of the upper side band wave of the signal read out of the optical recording medium to limit the band of the signal;
   polarity inverting means for restoring the band-limited signal to its original polarity after its demodulation; and
   de-emphasis means for correcting the high frequency characteristic of the polarity-inverted signal.

2. A television signal recording and reproducing system according to claim 1, characterized in that the inverting/modulating means is a frequency modulator which has an inputoutput characteristic which decrease the frequency of the modulated output with an increase in the input signal voltage.

3. A television signal recording and reproducing system according to claim 1, characterized in that the inverting/modulating means is composed of a polarity inverting amplifier and a frequency modulator which has an input-output characteristic which increases the frequency of the modulated output with an increase in the input signal voltage.

4. A television signal recording and reproducing system according to claim 1, further comprising means for changing frequency characteristics of the pre-emphasis means to compensate for deterioration of the frequency characteristic, which is caused by the filter means.

5. A television signal recording and reproducing system according to claim 1, further comprising an amplitude equalizer provided at a stage preceding the pre-emphasis means, and means for increasing the amount of frequency shift in said amplitude equalizer to compensate for deterioration of the frequency characteristic, which is caused by the filter means.

* * * * *